United States Patent [19]

Mondshine

[11] Patent Number: 4,619,776
[45] Date of Patent: Oct. 28, 1986

[54] CROSSLINKED FRACTURING FLUIDS

[75] Inventor: Thomas C. Mondshine, Houston, Tex.

[73] Assignee: Texas United Chemical Corp., Houston, Tex.

[21] Appl. No.: 763,630

[22] PCT Filed: Jul. 2, 1985

[86] PCT No.: PCT/US85/01269

§ 371 Date: Aug. 9, 1985

§ 102(e) Date: Aug. 9, 1985

[51] Int. Cl.$^4$ .......................................... E21B 43/26
[52] U.S. Cl. ............................. 252/8.551; 166/308; 252/315.3
[58] Field of Search ............ 252/8.55 R, 8.5 C, 315.3; 166/283, 308

[56] References Cited

U.S. PATENT DOCUMENTS

| | | | |
|---|---|---|---|
| 2,779,735 | 1/1957 | Brown et al. | 252/8.55 |
| 3,058,909 | 10/1962 | Kern | 252/8.55 X |
| 3,215,634 | 11/1965 | Walker | 252/311 |
| 3,562,176 | 2/1971 | Stancioff et al. | 252/315.3 |
| 3,974,077 | 10/1976 | Free | 252/8.55 |
| 4,250,044 | 2/1981 | Hinkel | 252/8.55 |
| 4,369,124 | 1/1983 | Elphingstone et al. | 252/8.55 X |

OTHER PUBLICATIONS

Chatterji et al., "Applications of Water Soluble Polymers in the Oil Field", *J. Pet. Tech.*, Nov., 1981, pp. 2042-2056.
Conway et al., "Chemical Model for the Rheological Behavior of Cross Linked Fluid Systems", Soc. Pet. Eng. Paper No. 9334, Sep. 21-24, 1980.

*Primary Examiner*—Herbert B. Guynn
*Attorney, Agent, or Firm*—Roy F. House

[57] ABSTRACT

Disclosed are hydraulic fracturing fluids of enhanced temperature stability containing boron crosslinked galactomannan polymers and methods of producing same. The temperature stability of fracturing fluids containing galactomannan polymers is increased by adding to the fracturing fluid a sparingly soluble borate having a slow solubility rate as defined herein. The sparingly soluble borate provides a pH in the range from about 8 to about 10, provides a source of boron for solublizing at elevated temperature thus enhancing the crosslinking of the galactomannan polymer, and it also decreases the leak-off properties of the fracturing fluid.

15 Claims, No Drawings

CROSSLINKED FRACTURING FLUIDS

FIELD OF THE INVENTION

The invention relates to viscous aqueous fluids, such as hydraulic fracturing fluids for oil and gas wells, containing a galactomannan polymer crosslinked with boron.

BACKGROUND OF THE INVENTION

It is well known that organic polyhydroxy compounds having hydroxyl groups positioned in the cis-form on adjacent carbon atoms or on carbon atoms in a 1,3-relationship react with borates to form five or six member ring complexes. At alkaline pH above about 8.0 these complexes form didiol crosslinked complexes, i.e.,

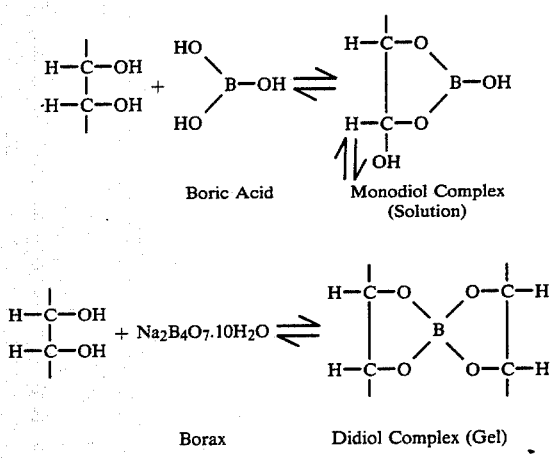

This leads to a valuable reaction with dissociated borate ions in the presence of polymers having the required hydroxyl groups in a cis-relationship. The reaction is fully reversible with changes in pH. An aqueous solution of the polymer will gel in the presence of borate when the solution is made alkaline, and will liquify again when the pH is lowered below about 8. If the dry powdered polymer is added to an alkaline borate solution, it will not hydrate and thicken until the pH is dropped below about 8. The critical pH at which gelation occurs is modified by the concentration of dissolved salts. The effect of the dissolved salts is to change the pH at which a sufficient quantity of dissociated borate ions exists in solution to cause gelation. The addition of an alkali metal base such as sodium hydroxide enhances the effect of condensed borates such as borax by converting the borax to the dissociated metaborate.

Known polymers which contain an appreciable content of cis-hydroxyl groups are exemplified by guar gum, locust bean gum, dextrin, polyvinyl alcohol, and derivatives of these polymers. Derivatives tend to react less with borate ions as the amount of substituting groups in the molecule increases. This results because the shear bulk of substituting groups changes the regular, alternating, and single-member branched, linear configuration of the molecule and prevents adjacent chains from approaching as closely as before, and the substitution of secondary cis-hydroxyl positions decreases the number of such unsubstituted positions available for complexing with the borate ion.

Strong reactions of such polymers are also obtained with solutions of certain inorganic cations. The addition of a high concentration of calcium salt, for example, will cause a polymer gel to form under alkaline conditions. If dry powdered polymer is added to the salt solution, the polymer will not generally hydrate and thicken. In general, the polymer will react with polyvalent cations much as it does with borate anions.

Depending on the relative concentration of polymer, and borate anion or polyvalent cation, the crosslinking reaction may produce useful gels, or may lead to insolubilization, precipitation, or unstable, non-useful gels. The viscosity of the hydrated polymer solution increases with an increase in the concentration of borate anion until a maximum is obtained. Thereafter the viscosity decreases and the gel becomes unstable as evidenced by a lumpy, inhomogeneous appearance and syneresis. As the temperature of the solution increases, the concentration of borate required to maintain the maximum degree of crosslinking, and thus maximum viscosity increases. Derivatization with non-ionic hydroxyalkyl groups greatly improves the compatibility of the polymer with most salts.

Hydraulic fracturing is a widely used method for stimulating petroleum producing subterranean formations and is commonly performed by contacting the formation with a viscous fracturing fluid having particulated solids, widely known as propping agents, suspended therein, applying sufficient pressure to the fracturing fluid to open a fracture in the subterranean formation, and maintaining this pressure while injecting the fracturing fluid into the fracture at a sufficient rate to extend the fracture into the formation. When the pressure is reduced, the propping agent within the fracture prevents the complete closure of the fracture.

The properties that a fracturing fluid should possess, are amongst others, low leakoff rate, the ability to carry a propping agent, low pumping friction loss, and it should be easy to remove from the formation. Low leakoff rate is the property that permits the fluid to physically open the fracture and one that controls its areal extent. The rate of leakoff to the formation is dependent upon the viscosity and the wall-building properties of the fluid. Viscosity and wall-building properties are controlled by the addition of appropriate additives to the fracturing fluid. The ability of the fluid to suspend the propping agent is controlled by additives. Essentially, this property of the fluid is dependent upon the viscosity and density of the fluid and upon its velocity. Friction reducing additives are added to fracturing fluids to reduce pumping loss due to friction by suppression of turbulence in the fluid. To achieve the maximum benefits from fracturing, the fracturing fluid must be removed from the formation. This is particularly true with very viscous fracturing fluids. Most of such viscous fluids have built-in breaker systems that reduce the viscous gels to low viscosity solutions upon exposure to the temperatures and pressures existing in the formations. When the viscosity is lowered, the fracturing fluid may be readily produced from the formation.

The use of aqueous based fluids to formulate fracturing fluids is well known. Such fluids generally contain a water soluble polymer viscosifier. Sufficient polymer is used to suspend the propping agent, decrease the leakoff rate, and decrease the friction loss of the fracturing fluid. Supplemental additives are generally required to further decrease the leakoff rate, such as hydrocarbons or inert solids, such as silica flour.

Various water soluble polymers have been proposed for use as viscosifiers for aqueous based fracturing fluids, such as polyacrylamides, partially hydrolized polyacrylamides, and various polysaccharide polymers such as guar gum and derivatives thereof, and cellulose derivatives. However, guar gum and guar gum derivatives are the most widely used viscosifiers. Guar gum is suitable for thickening both fresh and salt water, including saturated sodium chloride brines. At least two basic types of guar gum formulations are used to obtain a desirable gelled water-base fluid. These are classified as materials suitable for batch mix operations and materials suitable for continuous mix operations. The most widely used form is the continuous mix grade which hydrates rapidly and reaches a useable viscosity level fast enough that it can be added continuously as the fluid is pumped down the well. This grade of guar gum has a very small particle size. The easy mixing or batch mix grades of guar gum are designed to take advantage of the complexing action of guar gum with borax. In the presence of borax, the guar gum can be dissolved in a slightly alkaline solution without increasing the viscosity of the solution. Thus these easy mixing grades of guar are alkaline mixtures of guar gum and borax with a delayed-action acid.

There is disclosed in U.S. Pat. No. 3,974,077 a method of ultilizing the crosslinking reaction of borates with guar gum in a continuous mix process. The method comprises adding a compound for releasing borate ions into a flowing stream of aqueous fluid prior to or substantially concurrently with the addition to the fluid of a galacto-mannan gum, a buffer which produces an initial acidic pH in the fluid, and a delayed action basic compound to neutralize the buffer and produce a basic pH in the fluid after a period of time sufficient to permit introduction of the fluid into the well while still acidic and of low viscosity, and yet within a time period such that the guar gum hydrates and is crosslinked prior to reaching the formation. Thus the gelation time, or crosslinking time, is dependent upon the solubility rate of the delayed action basic compound and the time required to neutralize the acidic buffer.

Thus the crosslinking reaction of borate ions with guar gum or similar polymers having hydroxyl groups in a cis-relationship has been used in preparing fracturing fluids in the following manner:

(1) adding the polymer to an alkaline borate solution to prevent the polymer from hydrating, with subsequent lowering of the pH to form an acidic solution, thus breaking the borate crosslinking and allowing the polymer to hydrate;

(2) adding the polymer to a borate containing solution with an acidic buffer and a delayed action (slowly soluble) basic compound such that the polymer hydrates at the acidic pH before the pH is raised initiating the crosslinking reaction.

I have disclosed in copending International Patent Application No. PCT/US83/01408 the use of hydrated borates as bridging agents in well drilling, workover and completion fluids, including fracturing fluids.

SUMMARY OF THE INVENTION

I have now found that superior guar containing hydraulic fracturing fluids having enhanced thermal stability and decreased leak off rate can be obtained utilizing from about 1.5 kg/m$^3$ to about 15 kg/m$^3$ of a sparingly soluble borate having a slow solubility rate to provide sufficient borate anions to crosslink the guar polymer, raise the pH, and provide a reserve of available borate ions to crosslink the polymer at high temperature.

I have further found that alkaline earth metal borates or alkali metal alkaline earth metal borates have unique solubility characteristics which enable them to be used in the controlled crosslinking of aqueous systems containing guar polymers. The rate of crosslinking can be controlled by suitable adjustment of one or more of the following variables: initial pH of the aqueous system, relative concentration of one or more of the sparingly soluble borates, temperature of the aqueous system, and particle size of the borate.

The invention also provides fracturing fluids of enhanced thermal stability in which a hydrateable polymer such as guar gum and derivatives thereof are crosslinked with conventional water soluble sources of boron, such as boric acid and the alkali metal borates, the enhanced thermal stability being provided by incorporating a sparingly soluble borate in the fracturing fluid.

Thus the invention provides superior boron crosslinked guar containing hydraulic fracturing fluids having enhanced thermal stability, decreased leak off, and controlled crosslink rate, and methods for preparing such fracturing fluids.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENTS

The use of crosslinked fracturing fluids has increased steadily since their introduction in 1968. It is known that for each crosslinker (crosslinking agent) there is a maximum temperature where the crosslinker fails to give any increase in viscosity over that observed for the base gel. It has been disclosed that the general upper temperature limit for boron crosslinked gels is within the range from about 65° C. to about 100° C. There is a specific temperature within this general range at which the boron fails to give the desired viscosity increase. The specific temperature is dependent on the shear intensity, pH, and concentration of boron and polymer.

The temperature stability of aqueous fracturing fluids based on guar gum or derivatized guar polymers as the basic viscosifying agent is extended by adding various stabilizing agents, such as methanol or other water miscible alcohols which function as reducing agents, oxygen scavengers, and the like. While such additives increase the temperature stability of the guar polymers, they have little effect on the strength of the crosslinking bond in boron crosslinked gels. Hence such additives do not enhance the thermal stability of boron crosslinked gels other than their effect on the base polymer, and the viscosity of a boron crosslinked system rapidly approaches the viscosity of a corresponding system containing no boron crosslinking agent.

I have found that the temperature stability of fracturing fluids containing boron crosslinked guar polymer viscosifiers is increased by providing an enhanced concentration of boron for enhanced crosslinking at elevated temperatures. The concentration of boron required is such that unstable, over crosslinked gels result at ambient temperatures when the boron source is soluble, such as the alkali metal borates and boric acid. However, I have discovered that sparingly soluble borates selected from the group consisting of alkaline earth metal borates, alkali metal alkaline earth metal borates, and mixtures thereof, have a solubility rate which enables them to be added to fracturing fluids containing guar polymers at concentrations sufficient to increase the temperature stability of the fracturing fluid without forming an unstable, over crosslinked gel at ambient temperatures. The "reserve" of boron becomes available for crosslinking over a period of time, at a rate dependent on the temperature of the fluid, to increase the thermal stability of the crosslinked gel.

Additionally, the fracturing fluids of this invention have better leak-off properties than corresponding fracturing fluids containing soluble boron sources, and the reserve of sparingly soluble borate buffers the pH in a range from 8–10 thus preventing the acid degradation of the polymer and the breaking of the crosslink bond which occurs due to a decrease in the pH of the fracturing fluid.

The fracturing fluids of this invention comprise an aqueous medium, a polymeric viscosifier which is capable of being crosslinked with boron, and a sparingly soluble borate crosslinking agent, all as more particularly defined hereinafter.

The aqueous medium may be any aqeuous liquid generally used to prepare fracturing fluids. Preferred are aqueous solutions containing one or more salts which help to prevent the swelling and dispersion of clays in the formation to be fractured. Such salts include sodium chloride, potassium chloride and calcium chloride. Preferred are aqueous solutions containing from about 0.5% to about 5% by weight potassium chloride, most preferably from about 1% to about 3% by weight.

The polymeric viscosifiers which are useful in the practice of this invention are known polyhydroxy polymers having hydroxyl groups positioned in the cis-form on adjacent carbon atoms. Preferred are galactomannan gums or derivatives thereof. Galactomannan gums as employed in the present invention are those natural gums, derivatives and modifications of galactomannan gums which are characterized as containing a backbone consisting essentially of mannos units having various amounts of galactos units attached to the linear backbone formed by the mannos units. These gums are also characterized as having cis hydroxyl groups. Many of the useful commercial forms of galactomannans comprise a mixture of polymeric units containing different linear chain lengths and different ratios of galactos units to mannos units. Typical of natural galactomannans which can be employed in the practice of the present invention are guar gum, locust bean gum, gums derived from endosperm seeds such as the sinkas, brazelwood, tara, honey locust, and the like. Well-known modifications can be made to these natural galactomannans to produce various results such as greater stability at elevated temperatures, greater solubility in water at certain temperatures, and the like. Various modifications and derivatives of galactomannans which are useful include, for example, hydroxypropyl guar, hydroxyethyl guar, carboxymethyl guar, carboxymethylhydroxyethyl guar, and carboxymethylhydroxypropyl guar. Preferred are guar gum, hydroxypropyl guar, and carboxymethylhydroxypropyl guar.

Preferably the fracturing fluid will contain from about 1.2 kg/m$^3$ to about 12 kg/m$^3$ of the polymer viscosifier, most preferably from about 2.4 kg/m$^3$ to about 7.2 kg/m$^3$.

The sparingly soluble borates which are useful in the practice of the invention are alkaline earth metal borates, alkali metal alkaline earth metal borates, and mixtures thereof. Exemplary minerals which are representative of these classes of borates are as follows:

Probertite: $NaCaB_5O_9.5H_2O$
Ulexite: $NaCaB_5O_9.8H_2O$
Nobleite: $CaB_6O_{10}.4H_2O$
Gowerite: $CaB_6O_{10}.5H_2O$
Frolovite: $Ca_2B_4O_8.7H_2O$
Colemanite: $Ca_2B_6O_{11}.5H_2O$
Meyerhofferite: $Ca_2B_6O_{11}.7H_2O$
Inyoite: $Ca_2B_6O_{11}.13H_2O$
Priceite: $Ca_4B_{10}O_{19}.7H_2O$
Tertschite: $Ca_4B_{10}O_{19}.20H_2O$
Ginorite: $Ca_2B_{14}O_{23}.8H_2O$
Pinnoite: $MgB_2O_4.3H_2O$
Paternoite: $MgB_8O_{13}.4H_2O$
Kurnakovite: $Mg_2B_6O_{11}.15H_2O$
Inderite: $Mg_2B_6O_{11}.15H_2O$
Preobrazhenskite: $Mg_3B_{10}O_{18}.4\frac{1}{2}H_2O$
Hydroboracite: $CaMgB_6O_{11}.6H_2O$
Inderborite: $CaMgB_6O_{11}.11H_2O$
Kaliborite (Heintzite): $KMg_2B_{11}O_{19}.9H_2O$
Veatchite: $SrB_6O_{10}.2H_2O$ The sparingly soluble borate is preferably hydrated as indicated by the minerals set forth hereinabove. The water of hydration can be varied by heating the borate at elevated temperatures to remove any amount of water desired, including complete dehydration. Thus the empirical formula for the sparingly soluble borate may be expressed as follows:

$$(AM)_a(AEM)_bB_cO_d.xH_2O$$

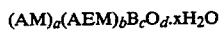

where a, b, c and d are integers, $0 \leq a \leq 2$, $1 \leq b \leq 4$, $2 \leq c \leq 14$, $d = 0.5a + b + 1.5c$, $0 \leq x \leq 20$, AM is an alkali metal, and AEM is an alkaline earth metal. Preferably AM is Na, K, or mixtures thereof; AEM is Ca, Mg, or mixtures thereof; $c \geq 5$; $1 \leq x \leq 15$.

Preferred borates are the alkaline earth metal and alkali metal alkaline earth metal borates containing at least 5 boron atoms per molecule, i.e., pentaborates, hexaborates, decaborates, and the like. Most preferably, the borates are selected from the group consisting of Ulexite, Colemanite, Probertite, and mixtures thereof.

For the purposes of this invention, "sparingly soluble" is defined as having a solubility in water at 22° C. of less than 10 kg/m$^3$.

The fracturing fluids of this invention are prepared by hydrating the polymeric viscosifier in the aqueous phase and thereafter crosslinking the polymer with the borate. As discussed hereinbefore, crosslinking with boron occurs at a pH above about 8.0. If crosslinking occurs before the polymer is hydrated, full viscosity development from the polymer is unobtainable. Thus it is preferred to use a fast hydrating polymer, such as a very finely ground polymer. Various factors effect the rate of hydration of guar and guar derivatives. These include temperature, pH, electrolyte content of the aqueous phase, and degree of dispersion of the guar polymer. The hydration rate decreases as the temperature of the aqueous phase decreases. The hydration rate of guar polymer is decreased dramatically at basic pH, particularly above about 8.5. The rate of hydration may be increased or decreased depending on the electrolyte and its concentration in the aqueous medium.

The polymer and the sparingly soluble borate(s) can be admixed together and added to an aqueous medium provided that the pH of the aqueous medium is below about 8.0, preferably from 4 to 7, to allow the polymer to hydrate before the sparingly soluble borate dissolves to such an extent that the pH is increased above about 8.0 and before sufficient borate anions are solubilized to crosslink the polymer. In this manner it can be utilized in a continuous mix process. Alternatively, the sparingly soluble borate, or mixture of sparingly soluble borates, and the polymer can be admixed with an acidic buffer, and this mixture added to an aqueous liquid to prepare the fracturing fluid in a continuous mix process. In this case the acidic buffering agent allows the polymer to hydrate before the sparingly soluble borate is solubilized to the extent that the pH is raised above about 8.0 and sufficient borate anions are provided to crosslink the polymer.

In preparing the fracturing fluids of this invention, all that is required is that the polymer disperse and hydrate in the aqueous liquid before it is crosslinked with the boron source regardless of the order of addition of the components of the fracturing fluid to the aqueous liquid carrier.

Once the polymer is dispersed and hydrated, the pH can be adjusted to any desired pH in the range from about 4 to about 10, either buffered or non-buffered, in order to control the crosslinking time of the polymer by the sparingly soluble borate.

The crosslinking of the fracturing fluid must occur before the fracturing fluid reaches the desired location in the well where the subterranean formation is to be fractured. In general, matching of the crosslinking time, or gelation time, with the amount of time required for the fracturing fluid to reach the fracture zone in the well bore will be controlled by the pumping rate. Normally from 2 to 4 minutes is required, although longer and shorter times may be required. It is preferred that the crosslinking occur as the fracturing fluid is pumped down the well rather than crosslinking the fluid before pumping is initiated. In this case it is imperative that the crosslink time be controlled in a predictable manner.

Various factors effect the crosslinking rate of the fracturing fluids of this invention. They are: (1) the characteristics of the polymer; (2) the solubility rate of the borate or mixture of borates used to crosslink and provide high temperature stability; (3) the concentration of borate; (4) the initial pH of the fracturing fluid; (5) the temperature of the fracturing fluid; and (6) the salinity of the fracturing fluid. Thus for any particular aqueous electrolyte solution, temperature, and polymer, the crosslinking rate is controlled by the solubility rate of the borate or mixture of borates, the concentration of the borate, and the initial pH of the fracturing fluid (aqueous phase).

The concentration of sparingly soluble borate should be in the range from about 1.5 kg/m$^3$ to about 15 kg/m$^3$, preferably from about 2.0 kg/m$^3$ to about 10 kg/m$^3$, in the fracturing fluids of this invention. However, in those aspects of this invention wherein a more soluble source of boron, such as boric acid or alkali metal borates, is present for ambient temperature crosslinking and the sparingly soluble borate is added for enhancing the temperature stability of the fracturing fluid, the concentration of sparingly soluble borate may be as low as about 0.5 kg/m$^3$.

The solubility rate of ulexite, colemanite, probertite, and colemanite calcined to remove about 15.5% water of hydration was determined by measuring the concentration of boron released into the solution upon mixing these minerals in a 2% by weight potassium chloride solution at a pH of seven (adjusted with acetic acid). The data obtained are given in Table 1. Also presented in Table 1 are the calculated concentrations of soluble borate, the equivalent concentration of boric acid based on the soluble boron concentration, and the % borate solubilized.

The solubility rate of the borates is increased upon raising the temperature of the aqueous solution. Thus the solubility rate of probertite and colemanite was determined by continuously mixing 2.4 kg/m$^3$ of each mineral in a 2% by weight potassium chloride solution at a pH of 7 while heating the solution at a rate of about 3° C./minute and determining the concentration of boron released at various temperatures. The data obtained are given in Table 2.

The increase in pH as a function of time upon adding ulexite, colemanite, and probertite to a 2% by weight potassium chloride solution having an initial pH of 7 was measured. The data obtained are given in Table 3.

The crosslink times for fracturing fluids containing 4.8 kg/m$^3$ of a hydroxypropyl guar polymer in a 2% by weight potassium chloride solution containing various quantities of sparingly soluble borates are given in Table 4. The data indicate that any desired crosslink time can readily be obtained at any fluid temperature by suitably choosing the concentration of the borate or mixtures of borates and the initial pH of the aqueous fluid.

The solubility rate of the sparingly soluble borate is a function of the temperature of the aqueous fracturing fluid. Thus at ambient temperatures certain sparingly soluble borates may not have a solubility rate sufficient to crosslink the fracturing fluid at the desired concentration in the desired time. Thus colemanite and probertite have such a slow solubility rate at ambient temperature of 22.2° C. and at an initial pH of 7, as indicated in Table 1, that crosslinking may not occur within a reasonable time. However, at elevated temperatures, sufficient solubility is obtained to readily crosslink, as indicated by the data in Table 2. Thus sparingly soluble borates such as probertite and colemanite which have a solubility which may be insufficient for crosslinking at ambient temperatures, depending on their concentration, may be admixed with a faster dissolving borate, such as ulexite, to provide an increased concentration of sparingly soluble borate. Moreover, sparingly soluble borates can be added to fracturing fluids containing a more soluble source of boron, such as boric acid or the alkali metal borates, to provide a "reserve" source of soluble boron to enhance the thermal stability of such fracturing fluids. Preferably, borates such as colemanite and probertite, which have a solubility rate such that less than about 25% by weight of the boron in the borate is soluble in water within 15 minutes at 22° C., are added to conventional borate crosslinked fracturing fluids to increase the thermal stability thereof, i.e., fracturing fluids utilizing boric acid or an alkali metal borate as the crosslinking agent. Such slow dissolving borates will not provide sufficient soluble boron for over crosslinking to occur at ambient temperatures, yet they provide soluble boron at elevated temperatures to increase the thermal stability of the fracturing fluids. This is another aspect of this invention.

At prevailing temperatures of about 10° C. or less, the solubility rate of the borate, such as ulexite, may be insufficient to effect crosslinking in the desired amount of time. Under such conditions a source of boron which has a higher initial solubility can be used in conjunction with the sparingly soluble borate, provided that the concentration of such faster dissolving boron source is less than the amount required to produce an unstable crosslinked gel. Such boron sources of enhanced initial solubility can be soluble in the fracturing fluids, such as boric acid or the various alkali metal borates, or may be sparingly soluble. Examples of the latter are the hydrated borates of this invention which have been calcined to remove the water of hydration or a portion of their water of hydration. Thus, as indicated in Table 4, the crosslinking time of 2.4 kg/m$^3$ ulexite at an initial pH of 7 at 4.4° C. is 4 minutes. Replacement of a portion of the ulexite with calcined colemanite, which has sufficient solubility rate at 4.4° C. for rapid crosslinking, significantly decreases the crosslinking time in a controlled manner.

The solubility rate of the sparingly soluble borate is also a function of the particle size of the borate. Desireably the borate will have a particle size as fine as possible, preferably less than 44 microns equivalent spherical diameter (−325 U.S. mesh). The effect of particle size on crosslink time is illustrated by the data in Table 5.

Preferably, the sparingly soluble borate or mixture of sparingly soluble borates has a solubility rate such that less than about 50% by weight of the boron in said borate or mixture of borates is soluble in water within 15 minutes at 22° C. when measured at the concentration at which the borate or mixture of borates is to be used in the fracturing fluid.

The solubility rate of the sparingly soluble borates could be decreased if necessary by coating the borates with waxes and the like water insoluble, low melting point materials.

The final crosslinked fracturing fluid should have a viscosity high enough to suspend any propping agents added to the fracturing fluid. The viscosity will depend on the concentration of viscosifier and temperature of the fracturing fluid.

The fracturing fluid of this invention can also contain fluid loss control additives, surfactants, propping agents, clay control chemicals, concentrations of salts which are compatible with the gelling agent, oxygen scavengers, water soluble alcohols, particularly alcohols having 1 to 3 carbon atoms, and breaker additives. Representative breaker additives are enzymes, compounds such as esters which convert to acids under well-treating conditions, and oxidizing agents. See for example U.S. Pat. No. 4,169,798, incorporated herein by reference, and references cited therein. Such breaker additives are well known in the art.

The viscosity stability of the fracturing fluids of this invention can be enhanced for extreme temperature conditions above about 135° C. by treatment with organoaluminate, organotitanate, or organozirconate chelate esters. Selected salts of aluminun (+3), titanium (+4), and zirconium (+4) can also provide thermal enhancement.

The following examples describe the manner and process of making and using the invention and set forth the best mode contemplated by the inventor or carrying out the invention but are not to be construed as limiting.

The crosslinking agents utilized in these examples had the following characteristics: (1) all were ground such that they had an equivalent spherical diameter of less than 44 microns (−325 U.S. mesh) unless otherwise indicated; (2) the concentration of boron in the crosslinking agents was as follows: ulexite=11.3%, colemanite-11.8%, probertite-8.3%, calcined colemanite=14.0%, boric acid-17.5%, and borax (sodium tetraborate decahydrate)=11.3%, all % by weight.

EXAMPLE 1

The solubility rate of several sparingly soluble borates was measured at 22.2° C. by continuously mixing various concentrations of the borates in a 2% by weight potassium chloride solution at a pH of 7, adjusted with acetic acid, withdrawing an aliquot of the mixtures after various periods of time, rapidly filtering, and determining the concentration of soluble boron in the filtrate by atomic absorption. The results obtained, given in Table 2, were used to calculate the concentration of soluble borate, the concentration of boric acid equivalent to this concentration of soluble boron, and the percent of the borate solubilized. These calculated values are also given in Table 1.

EXAMPLE 2

The effect of temperature on the solubility of probertite and colemanite was measured by mixing 2.4 kg/m$^3$ of each borate in a 2% by weight potassium chloride solution at a pH of 7, adjusted with acetic acid, heating the mixture while mixing at a rate of about 3° C./minute, withdrawing an aliquot of the mixture at various temperatures, rapidly filtering, and determining the boron concentration in the filtrate by atomic absorption. The results obtained, given in Table 2, were used to calculate the concentration of soluble borate, the concentration of boric acid equivalent to this concentration of soluble boron, and the percent of the borate solubilized. These calculated values are given in Table 2.

EXAMPLE 3

Various concentrations of several sparingly soluble borates were mixed at 22.2° C. in a 2% by weight potassium chloride solution at a pH of 7, adjusted with acetic acid, and the pH of the mixtures was measured after various periods of time. The results obtained are given in Table 3.

EXAMPLE 4

A fracturing fluid was prepared by hydrating 4.8 kg/m$^3$ of a hydroxypropyl guar polymer (0.4 MS) in a 2% by weight solution of potassium chloride. Aliquots of this base fluid were mixed with acetic acid or NaOH to produce base fluids having a pH in the range from 4 to 10 as indicated in Table 4. Thereafter various concentrations of various sparingly soluble borates or mixtures of sparingly soluble borates were added to these base fluids, as indicated in Table 4, and the viscosity was measured as a function of time with a Brookfield Model HBTD viscometer, spindle no. 2. The time for the viscosity to reach 6400 centipoises (6.4 Pa.S), the maximum obtainable viscosity with this instrument, was taken as a measure of the crosslink time (gelation time).

The data obtained are given in Table 4. The effect of temperature on the crosslink time was measured by first cooling the base fluid to 4.4° C. (40° F.) before adding the borate in several tests.

The data in Table 1 indicate that: Ulexite has a solubility rate such that less than 50% by weight of the boron in this borate is soluble within 15 minutes at 22° C.; colemanite and probertite have a solubility rate such that less than 25% by weight of the boron in these borates is soluble within 15 minutes at 22° C.; and colemanite which has been calcined to remove about 15.5% by weight water of hydration has a much faster initial solubility and solubility rate.

The data in Table 2 indicate that the solubility rate of the sparingly soluble borates is increased at elevated temperatures.

The data in Table 3 indicate that the pH of solutions of ulexite and the calcined colemanite rapidly raise the pH to 9.0 whereas colemanite and probertite raise the pH much more slowly.

Taken collectively, the data in Tables 1–3 indicate that these sparingly soluble borates would effect the crosslink time of a guar polymer containing fracturing fluid as follows: calcined colemanite<ulexite<colemanite<probertite. The data in Table 4 indicates that this order is in fact observed. Colemanite and probertite have such a low solubility rate at ambient temperature that they can be admixed with a guar polymer containing fracturing fluid containing faster dissolving borate sources to provide increased soluble borate at elevated temperatures while maintaining a controlled crosslink time at ambient temperatures. Moreover, the sparingly soluble calcined colemanite has a solubility rate such that very fast crosslink times are obtained. Such sparingly soluble borates can be admixed with other sparingly soluble borates to decrease the crosslink time, such as at low ambient temperatures, and still allow high concentrations of sparingly soluble borates to be added for enhanced temperature stability of the fracturing fluid.

EXAMPLE 5

A base fracturing fluid was prepared as in Example 4 having an initial pH of 7. Aliquots of this fluid were treated with 2.4 kg/m$^3$ of ulexite of varying particle size as indicated in Table 5. The crosslink time was measured using the procedure of Example 4. The pH of the fracturing fluid was also measured. The data obtained, given in Table 5, indicate that the particle size can range from about 0 to about 500 microns, preferably as fine as possible, such as about 100 microns maximum, most preferably about 50 microns maximum.

EXAMPLE 6

Sparingly soluble ulexite was compared at 22.2° C. to borax, sodium tetraborate decahydrate, and boric acid as a crosslinking additive in a base fracturing fluid prepared as in Example 4 having an initial pH of 7. The crosslink time for various concentrations of each borate was measured as in Example 4 at a pH of 8.5–9.0, and the condition of the crosslinked gel obtained was observed. The data obtained are given in Table 6. The data indicate that the ulexite provides for a controlled crosslink rate and forms very good elastic gels at very high concentrations of borate. In contrast, the borax immediately gelled the fracturing fluid and produced unstable gels at concentrations in excess of about 1.2 kg/m$^3$, and the boric acid produced unusable gels between 0.39 and 0.77 kg/m$^3$.

EXAMPLE 7

A base fracturing fluid was prepared as in Example 4 having an initial pH of 7. This base fluid was mixed with various concentrations of ulexite, boric acid, or borax, crosslinked, placed in a Fann Model 50 viscometer, heated to 110° C. and the viscosity measured over a period of two hours. The data obtained are given in Table 7.

The fracturing fluids crosslinked with boric acid and borax exhibited poor thermal stability as indicated by the data in Table 7. This data also indicates that the fracturing fluids containing greater than about 1.5 kg/m$^3$ of ulexite had excellent thermal stability. The fracturing fluids containing ulexite were all very good elastic gels at ambient temperature.

EXAMPLE 8

A base fracturing fluid was prepared as in Example 4 having an initial pH of 7. This base fluid was mixed with various concentrations of ulexite, crosslinked, and the leak off rate determined at various temperatures using the American Petroleum Institute recommended procedure for fluid loss, API RP 39, 2nd Edition, January, 1983. The base fluid crosslinked with boric acid at a pH of 9.3 was also evaluated. Additionally, 5% by volume of No. 2 diesel oil was evaluated as a leak off control additive in these fracturing fluids. Silica flour was also evaluated as a leak off control additive in the boric acid crosslinked fracturing fluid. The data obtained are given in Table 8.

The data indicate that the ulexite crosslinked gels had better leak off control properties than the boric acid crosslinked gels. The diesel oil was particularly effective as a supplemental leak off control additive in the presence of the ulexite. The ulexite demonstrated leak off control comparable to silica flour, a common leak off additive for fracturing fluids.

TABLE 1

Solubility Rate of Various Hydrated Borates at 22.2° C.

| Initial Borate Concentration kg/m$^3$ | Borate Added/ Property Evaluated | Solubilizing Time, min. | | | | | | | | |
|---|---|---|---|---|---|---|---|---|---|---|
| | | 1 | 2 | 3 | 4 | 5 | 15 | 30 | 60 | 960 |
| 2.4 | Ulexite | | | | | | | | | |
| | [B, kg/m$^3$] | 0.043 | 0.050 | 0.057 | 0.064 | 0.071 | 0.115 | 0.16 | 0.23 | 0.27 |
| | [Ulexite, kg/m$^3$] | 0.38 | 0.44 | 0.50 | 0.56 | 0.62 | 1.0 | 1.4 | 2.0 | 2.4 |
| | [Boric Acid, kg/m$^3$] | 0.25 | 0.28 | 0.32 | 0.36 | 0.40 | 0.66 | 0.92 | 1.3 | 1.55 |
| | % Ulexite Solubilized | 15.8 | 18.3 | 21.0 | 23.3 | 26.2 | 42.4 | 59.7 | 84.0 | 100 |
| 4.8 | Ulexite | | | | | | | | | |
| | [B, kg/m$^3$] | 0.067 | 0.089 | 0.11 | 0.13 | 0.14 | 0.23 | 0.29 | 0.39 | 0.54 |

TABLE 1-continued

Solubility Rate of Various Hydrated Borates at 22.2° C.

| Initial Borate Concentration kg/m³ | Borate Added/ Property Evaluated | Solubilizing Time, min. | | | | | | | | |
|---|---|---|---|---|---|---|---|---|---|---|
| | | 1 | 2 | 3 | 4 | 5 | 15 | 30 | 60 | 960 |
| | [Ulexite, kg/m³] | 0.59 | 0.79 | 0.97 | 1.15 | 1.24 | 2.04 | 2.6 | 3.5 | 4.8 |
| | [Boric Acid, kg/m³] | 0.38 | 0.51 | 0.62 | 0.74 | 0.80 | 1.3 | 1.7 | 2.3 | 3.1 |
| | % Ulexite Solubilized | 12.3 | 16.5 | 20.2 | 24.0 | 25.8 | 42.5 | 54.2 | 72.9 | 100 |
| 7.2 | Ulexite | | | | | | | | | |
| | [B, kg/m³] | 0.091 | 0.12 | 0.15 | 0.17 | 0.20 | 0.30 | 0.39 | 0.50 | 0.78 |
| | [Ulexite, kg/m³] | 0.81 | 1.06 | 1.33 | 1.50 | 1.77 | 2.66 | 3.46 | 4.4 | 6.9 |
| | [Boric Acid, kg/m³] | 0.52 | 0.68 | 0.86 | 0.97 | 1.14 | 1.7 | 2.2 | 2.8 | 4.5 |
| | % Ulexite Solubilized | 11.2 | 14.7 | 18.5 | 20.8 | 24.6 | 36.9 | 48.0 | 61.1 | 95.8 |
| 2.4 | Colemanite (Calcined) | | | | | | | | | |
| | [B, kg/m³] | 0.12 | 0.17 | 0.20 | 0.21 | 0.22 | 0.26 | 0.27 | 0.28 | ND* |
| | [Colemanite, kg/m³] | 0.86 | 1.2 | 1.4 | 1.5 | 1.6 | 1.8 | 1.9 | 2.0 | |
| | [Boric Acid, kg/m³] | 0.69 | 0.98 | 1.2 | 1.2 | 1.3 | 1.5 | 1.6 | 1.6 | |
| | % Colemanite Solubilized | 36 | 50 | 58 | 62 | 67 | 75 | 79 | 83 | |
| 2.4 | Colemanite | | | | | | | | | |
| | [B, kg/m³] | 0.012 | 0.012 | 0.012 | 0.020 | 0.025 | 0.037 | 0.042 | 0.049 | ND* |
| | [Colemanite, kg/m³] | 0.10 | 0.10 | 0.10 | 0.17 | 0.21 | 0.31 | 0.36 | 0.42 | |
| | [Boric Acid, kg/m³] | 0.07 | 0.07 | 0.07 | 0.11 | 0.14 | 0.21 | 0.24 | 0.28 | |
| | % Colemanite Solubilized | 4.2 | 4.2 | 4.2 | 7.1 | 8.8 | 12.9 | 15 | 17.5 | |
| 2.4 | Probertite | | | | | | | | | |
| | [B, kg/m³] | 0 | 0 | 0 | 0 | 0 | 0.012 | 0.024 | 0.049 | ND* |
| | [Probertite, kg/m³] | 0 | 0 | 0 | 0 | 0 | 0.14 | 0.29 | 0.59 | |
| | [Boric Acid, kg/m³] | 0 | 0 | 0 | 0 | 0 | 0.07 | 0.14 | 0.28 | |
| | % Probertite Solubilized | 0 | 0 | 0 | 0 | 0 | 6.0 | 12.0 | 24.5 | |

*ND = Not Determined

TABLE 2

Solubility of Probertite and Colemanite on Heating

| Initial Borate Concentration kg/m³ | Borate Added/ Property Evaluated | Temperature, °C. | | | | | |
|---|---|---|---|---|---|---|---|
| | | 26.7 | 48.9 | 60 | 71.1 | 82.2 | 93.3 |
| 2.4 | Probertite | | | | | | |
| | [B, kg/m³] | 0.012 | 0.049 | 0.073 | 0.11 | 0.17 | 0.20 |
| | [Probertite, kg/m³] | 0.14 | 0.59 | 0.88 | 1.3 | 2.0 | 2.4 |
| | [Boric Acid, kg/m³] | 0.069 | 0.28 | 0.42 | 0.64 | 0.98 | 1.2 |
| | % Probertite Solubilized | 6.0 | 24.5 | 36.5 | 55 | 85 | 100 |
| 2.4 | Colemanite | | | | | | |
| | [B, kg/m³] | 0.049 | 0.074 | 0.099 | 0.14 | 0.18 | 0.28 |
| | [Colemanite, kg/m³] | 0.41 | 0.63 | 0.84 | 1.2 | 1.5 | 2.4 |
| | [Boric Acid, kg/m³] | 0.28 | 0.42 | 0.57 | 0.80 | 1.0 | 1.6 |
| | % Colemanite Solubilized | 17 | 26 | 35 | 50 | 62 | 100 |

TABLE 3 pH v. Time for Several Borates

| Borate | [Borate] kg/m³ | pH After Indicated Minutes | | | | | |
|---|---|---|---|---|---|---|---|
| | | 0 | 0.25 | 0.5 | 0.75 | 1.0 | 60 |
| Ulexite | 1.2 | 6.9 | 7.0 | 7.1 | 7.35 | 7.5 | 9.0* |
| Ulexite | 2.4 | 7.0 | 8.6 | 9.2 | 9.25 | 9.3 | 9.3 |
| Ulexite | 4.8 | 7.0 | 9.2 | 9.3 | 9.3 | 9.3 | 9.3 |
| Ulexite | 7.2 | 7.0 | 9.2 | 9.3 | 9.3 | 9.3 | 9.3 |
| Colemanite | 2.4 | 7.0 | 7.4 | 7.6 | 7.8 | 8.0 | 8.9* |
| Probertite | 2.4 | 7.0 | 7.2 | 7.3 | 7.4 | 7.5 | 8.6* |
| Probertite | 4.8 | 7.0 | 7.25 | 7.4 | 7.5 | 7.55 | 8.7* |
| Calcined Colemanite | 2.4 | 7.0 | 8.9 | 9.1 | 9.1 | 9.1 | 9.3 |

*After 15 minutes, test terminated

TABLE 4

Effect of the Initial pH and Temperature of a Fracturing Fluid on the Crosslinking Time

| Borate | [Borate] kg/m³ | Temp. °C. | Crosslink Time, min. @ Initial pH of Fluid* | | | | | |
|---|---|---|---|---|---|---|---|---|
| | | | 4 | 5 | 6 | 7 | 8 | 10 |
| Ulexite | 0.6 | 22.2 | ND | ND | ND | ND | 29.7 | 16.5 |
| Ulexite | 1.2 | 22.2 | ND | ND | ND | 7.7 | 8.9 | 6.8 |
| Ulexite | 2.4 | 22.2 | ND | 14.4 | 6.8 | 3.4 | 3.0 | 3.4 |
| Ulexite | 4.8 | 22.2 | 12.6 | 5.0 | 2.2 | 1.7 | ND | ND |
| Ulexite | 7.2 | 22.2 | 4.1 | 2.3 | 1.6 | 1.0 | ND | ND |
| Ulexite | 2.4 | 4.4 | ND | ND | ND | 4.0 | ND | ND |
| Colemanite | 2.4 | 22.2 | ND | ND | ND | >20 | ND | ND |
| Colemanite | 4.8 | 22.2 | ND | ND | ND | 8.6 | ND | ND |

TABLE 4-continued
Effect of the Initial pH and Temperature of a Fracturing Fluid on the Crosslinking Time

| Borate | [Borate] kg/m³ | Temp. °C. | Crosslink Time, min. @ Initial pH of Fluid* | | | | | |
|---|---|---|---|---|---|---|---|---|
| | | | 4 | 5 | 6 | 7 | 8 | 10 |
| Probertite | 2.4 | 22.2 | ND | ND | ND | >20 | ND | ND |
| Calcined Colemanite | 2.4 | 22.2 | None | ND | ND | 0.2 | 0.2 | 0.2 |
| Calcined Colemanite | 7.2 | 22.2 | 1.6 | ND | ND | 0.2 | 0.2 | 0.2 |
| Calcined Colemanite | 2.4 | 4.4 | ND | 0.5 | 0.3 | ND | ND | ND |
| Ulexite + Calcined Colemanite | 1.6 + 0.8 | 4.4 | ND | 3.8 | 1.5 | 0.7 | ND | ND |
| Ulexite + Calcined Colemanite | 1.8 + 0.6 | 4.4 | ND | 7.2 | 2.4 | 1.4 | ND | ND |
| Ulexite + Colemanite | 2.4 + 4.8 | 22.2 | ND | ND | ND | 0.7 | ND | ND |

*ND = Not Determined

TABLE 5
The Effect of Particle Size of Ulexite on Crosslink Time

| Particles Through Indicated U.S. Mesh Screen | Particles Retained On Indicated U.S. Mesh Screen | Particle Size Range Microns | Crosslink Time, min. | pH When Crosslinked |
|---|---|---|---|---|
| 20 | 40 | 420–841 | 20.0 | 8.8 |
| 40 | 60 | 250–420 | 6.1 | 8.7 |
| 60 | 100 | 149–250 | 5.7 | 8.7 |
| 100 | 140 | 105–149 | 4.9 | 8.7 |
| 140 | 200 | 74–105 | 3.9 | 8.8 |
| 325 | — | 44 max. | 3.4 | 9.3 |
| 20 | Pan | 0–841 | 19.25 | 8.95 |
| 40 | Pan | 0–420 | 5.25 | 8.9 |
| 60 | Pan | 0–250 | 5.0 | 8.9 |
| 100 | Pan | 0–149 | 4.25 | 8.9 |
| 140 | Pan | 0–105 | 3.3 | 8.9 |
| 200 | Pan | 0–74 | 3.1 | 8.6 |

TABLE 7
Effect of Various Borates on the Thermal Stability of Fracturing Fluids

| Boron Source | [Boron Source] kg/m³ | Equivalent [Boric Acid] kg/m³ | Apparent Viscosity, cp. at 170 sec.$^{-1}$ Hours at 110° C. | | | | |
|---|---|---|---|---|---|---|---|
| | | | 0 | 0.5 | 1.0 | 1.5 | 2.0 |
| Boric Acid | 0.36 | 0.36 | 137 | 104 | 78 | — | — |
| Sodium Tetraborate Decahydrate | 1.4 | 0.9 | 235 | 128 | 109 | 88 | 79 |
| Ulexite | 0.6 | 0.39 | 23 | 22 | 25 | — | — |
| Ulexite | 1.2 | 0.77 | 54 | 48 | 52 | 29 | 43 |
| Ulexite | 2.4 | 1.5 | 282 | 241 | 209 | 205 | 177 |
| Ulexite | 3.6 | 2.3 | 324 | 264 | 251 | 289 | 283 |
| Ulexite | 4.8 | 3.1 | 253 | 241 | 229 | 235 | 248 |
| Ulexite | 7.2 | 4.6 | 317 | 271 | 252 | 233 | 221 |
| Ulexite | 9.6 | 6.2 | 167 | 265 | 283 | 283 | 312 |

TABLE 6
Comparison of Ulexite and Borax as Crosslinking Agents

| Boron Source Concentration kg/m³ | Boron Source | Equivalent [Boric Acid] kg/m³ | Crosslink Time, min. | Condition of Crosslinked Gel |
|---|---|---|---|---|
| 0.6 | Ulexite | 0.39 | 15 | Fair gel |
| 1.2 | Ulexite | 0.77 | 7.7 | Good gel, more elastic with time |
| 1.8 | Ulexite | 1.2 | 3.3 | Good gel, more elastic with time |
| 2.4 | Ulexite | 1.5 | 3.0 | Very good elastic gel |
| 4.8 | Ulexite | 3.1 | 1.3 | Very good elastic gel |
| 7.2 | Ulexite | 4.6 | 0.5 | Very good elastic gel, more rigid with time |
| 0.3 | Borax | 0.19 | — | Never crosslinked, ph = 8.75 |
| 0.6 | Borax | 0.39 | <2 sec. | Good elastic gel |
| 1.2 | Borax | 0.77 | Immediate | Good elastic gel |
| 1.5 | Borax | 0.93 | Immediate | Rigid gel, shear sensitive |
| 1.8 | Borax | 1.2 | Immediate | Slightly choppy gel, very shear sensitive |
| 2.4 | Borax | 1.5 | Immediate | Choppy, syneresis apparent |
| 4.8 | Borax | 3.1 | Immediate | Choppy, syneresis |
| 7.2 | Borax | 4.6 | Immediate | Extensive syneresis |
| 0.3 | Boric Acid | 0.3 | <3 sec. | Very good elastic gel |
| 0.39 | Boric Acid | 0.39 | <3 sec. | Very good elastic gel |
| 0.77 | Boric Acid | 0.77 | <3 sec. | Slightly brittle gel, sl. shear sensitive |
| 1.2 | Boric Acid | 1.2 | <3 sec. | Slightly brittle gel, shear sensitive |
| 2.4 | Boric Acid | 2.4 | <3 sec. | Brittle gel, very shear sensitive |
| 4.8 | Boric Acid | 4.8 | <3 sec. | Rigid gel, syneresis, very shear sensitive |

TABLE 8

| | Leakoff Properties of Fracturing Fluids | | | | | | |
|---|---|---|---|---|---|---|---|
| | [Boron Source] | Equivalent [Boric Acid] | % by Volume | Cw × 1000 | | | |
| Boron Source | kg/m³ | kg/m³ | Diesel Fuel | 26.6° C. | 71.1° C. | 115.5° C. | 160° C. |
| Boric Acid | 1.8 | 1.8 | 0 | 2.15 | 3.85 | 4.8 | 5.55 |
| Ulexite | 2.4 | 1.55 | 0 | 2.0 | 3.55 | 4.4 | 5.3 |
| Ulexite | 4.8 | 3.1 | 0 | 1.95 | 3.05 | 3.9 | 4.85 |
| Ulexite | 7.2 | 4.6 | 0 | 1.8 | 2.85 | 3.8 | 4.35 |
| Ulexite | 9.6 | 6.2 | 0 | 1.85 | 2.7 | 3.5 | 4.2 |
| Boric Acid | 1.8 | 1.8 | 5 | 0.35 | 0.95 | 1.75 | 3.4 |
| Ulexite | 2.4 | 1.55 | 5 | 0.35 | 0.7 | 0.9 | 1.95 |
| Ulexite | 4.8 | 3.1 | 5 | 0.35 | 0.15 | 0.85 | 1.7 |
| Ulexite | 7.2 | 4.6 | 5 | 0.4 | 0.6 | 0.8 | 1.5 |
| Ulexite | 9.6 | 6.2 | 5 | 0.3 | 0.55 | 0.8 | 1.3 |
| Boric Acid* | 1.8 | 1.8 | 0 | 2.0 | 3.45 | 3.6 | 4.05 |
| Boric Acid* | 1.8 | 1.8 | 5 | 0.35 | 0.8 | 1.35 | 2.95 |
| Ulexite + Probertite | 2.4 / 7.2 | 5.0 | 0 | 1.83 | 2.90 | 3.09 | ND |

*Fluid contains 2.4 kg/m³ silica flour for leakoff control

I claim:

1. A method of preparing a fracturing fluid of enhanced temperature stability comprising hydrating in an aqueous liquid having a pH in the range from about 4.0 to about 8.0 a hydrophilic polymer containing at least two hydroxyl groups positioned in the cis-form on adjacent carbon atoms or on carbon atoms in a 1,3 relationship, adding to said aqueous liquid a sparingly soluble borate in an amount sufficient to provide sufficient boron to crosslink said polymer and to increase the thermal stability of said fracturing fluid, said sparingly soluble borate having at least five boron atoms per molecule and being selected from the group consisting of alkaline earth metal borates, alkali metal alkaline earth metal borates, and mixtures thereof, and controlling the time for crosslinking to occur by providing a pH of said aqueous liquid within the range from about 4.0 to about 10.0 before adding said borate thereto.

2. The method of claim 1 wherein said polymer is a galactomannan polymer or derivative thereof, and wherein said sparingly soluble borate is added in an amount from about 1.5 kg/m³ to about 15 kg/m³.

3. The method of claim 2 wherein said borate is selected from the group consisting of ulexite, colemanite, probertite, and mixtures thereof, wherein the initial pH of said aqueous liquid is within the range from about 4.0 to about 7.0, and wherein said polymer and said borate are added substantially simultaneously to said aqueous liquid.

4. The method of claim 1, 2, or 3 wherein the leak off rate is decreased by adding a liquid hydrocarbon to said fracturing fluid.

5. In a fracturing fluid in which a galactomannan polymer or derivative thereof is dispersed in an acidic liquid, the method of crosslinking and enhancing the thermal stability of said fracturing fluid which comprises incorporating into said fluid a sparingly soluble borate having at least five boron atoms per molecule and being selected from the group consisting of alkaline earth metal borates, alkali metal alkaline earth metal borates, and mixtures thereof, in an amount sufficient to maintain the pH of said fluid above about 8.0, to provide sufficient boron to crosslink said polymer, and to increase the thermal stability of said fluid, said borate or mixture of borates having a solubility rate such that less than about 50% by weight of the boron in said borate or mixture of borates is soluble in water within 15 minutes at 22° C., the time for crosslinking to occur being controlled as desired by providing an initial pH of said fluid within the range from about 4.0 to about 7.0.

6. The method of claim 5 wherein said borate or mixture of borates is added in an amount from about 1.5 kg/m³ to about 15 kg/m³.

7. The method of claim 6 wherein said galactomannan polymer is selected from the group consisting of guar gum, hydroxypropyl guar, hydroxyethyl guar, carboxymethylhydroxypropyl guar, carboxymethylhydroxyethyl guar, and mixtures thereof, and wherein said borate is selected from the group consisting of ulexite, colemanite, probertite, and mixtures thereof.

8. A well treating fluid comprising:
(a) an aqueous liquid;
(b) from about 2.4 kg/m³ to about 12 kg/m³ of a hydrophilic polymer viscosifier and suspension additive which contains at least two hydroxyl groups positioned in the cis-form on adjacent carbon atoms or on carbon atoms in a 1,3 relationship; and
(c) a sparingly soluble borate having at least five boron atoms per molecule and being selected from the group consisting of alkaline earth metal borates, alkali metal alkaline earth metal borates, and mixtures thereof, wherein the amount of said borate or mixture of borates is sufficient (1) to maintain the pH of said fluid above about 8.5, (2) to provide sufficient boron to crosslink with said polymer in the desired period of time, and (3) to provide sufficient boron for crosslinking at elevated temperatures such that the thermal stability of the fluid is increased.

9. The fluid of claim 8 wherein said hydrophilic polymer is a galactomannan polymer or derivative thereof.

10. The fluid of claim 9 wherein said galactomannan polymer is selected from the group consisting of guar gum, hydroxypropyl guar, hydroxyethyl guar, carboxymethylhydroxypropyl guar, carboxymethylhydroxyethyl guar, and mixtures thereof, and wherein said borate is selected from the group consisting of ulexite, colemanite, probertite, and mixtures thereof.

11. The fluid of claim 8, 9, or 10 wherein the concentration of said borate is from about 1.5 kg/m³ to about 15 kg/m³.

12. In a method of preparing a fracturing fluid comprising an aqueous liquid having a galactomannan polymer or derivative thereof hydrated therein wherein said polymer is crosslinked with boron provided by a compound which is completely soluble in said aqueous liquid at the concentration at which it is present in the fracturing fluid, the improvement which comprises adding to said aqueous liquid at least one sparingly soluble borate in an amount sufficient to increase the thermal stability of the fracturing fluid, said sparingly soluble borate having a solubility rate such that less than about 50% by weight of the boron in said sparingly soluble borate is soluble in water within 15 minutes at 22° C., wherein said sparingly soluble borate contains at least five boron atoms per molecule and is selected from the group consisting of alkaline earth metal borates, alkali metal alkaline earth metal borates, and mixtures thereof.

13. The method of claim 12 wherein the concentration of said sparingly soluble borate is from about 0.5 kg/m$^3$ to about 15 kg/m$^3$ of said fracturing fluid.

14. In a method of preparing a fracturing fluid comprising an aqueous liquid having a galactomannan polymer or derivative thereof hydrated therein wherein said polymer is crosslinked with boron provided by a compound selected from the group consisting of boric acid and alkali metal borates, the improvement which comprises adding to said aqueous liquid at least one sparingly soluble borate in an amount sufficient to increase the thermal stability of the fracturing fluid, said sparingly soluble borate having at least five boron atoms per molecule and being selected from the group consisting of alkaline earth metal borates, alkali metal alkaline earth metal borates, and mixtures thereof.

15. In a method of crosslinking an acidic aqueous liquid containing a galactomannan polymer or derivative thereof with a boron containing crosslinking agent, the improvement which comprises utilizing as said crosslinking agent a sparingly soluble borate having at least five boron atoms per molecule selected from the group consisting of alkaline earth metal borates, alkali metal alkaline earth metal borates, and mixtures thereof, and controlling the time for crosslinking to occur at the desired temperature of said aqueous liquid by suitable adjustment of:

(a) the initial pH of said aqueous liquid;
(b) the particle size of said sparingly soluble borate within the range from about 0 to about 500 microns;
(c) the concentration of said sparingly soluble borate; and
(d) the selection of the particular sparingly soluble borate or mixture of sparingly soluble borates;

provided that said concentration of said sparingly soluble borate is at least sufficient to raise the pH of said aqueous liquid to at least 8.0 and to provide sufficient boron for crosslinking said polymer.

* * * * *